April 6, 1965          B. L. HOUSE          3,176,478

ROLLER BEARING POWER TAKEOFF ASSEMBLY

Filed May 2, 1963

INVENTOR,
BENNIE L. HOUSE

United States Patent Office 3,176,478
Patented Apr. 6, 1965

3,176,478
ROLLER BEARING POWER TAKEOFF ASSEMBLY
Bennie L. House, Hickory Ridge, Ark.
Filed May 2, 1963, Ser. No. 277,614
3 Claims. (Cl. 64—23)

This invention relates to certain new and useful improvements in means for connecting power takeoff shafts of agricultural machines to extension shafts therefor for subsequent connection to tools being carried and operated thereby. Much difficulty has heretofore been encountered in the use of extension shafting coupled to power takeoff shafts in connection with such agricultural machines, particularly since no provision is made for variations in the length of the shafting which may occasionally occur during use, as for example in connection with irregular ground levels, although many attempts have been made to provide for some sort of a slip joint to accommodate these irregularities.

The present device provides a slip joint mechanism for interconnecting a power takeoff driven shaft with an extension shaft for conjunct rotation while permitting limited longitudinal movement of the extension shaft relative to the coupling supporting the extension shaft at its coupled end during such shift.

The present invention contemplates a roller bearing box mounted on the distal end of the power takeoff driven shaft and adapted to receive an end of the extension shaft, supporting the extension shaft for longitudinal movement relative to the power takeoff shaft while coupling the shafts together for the desired rotation.

The principal object of the present invention is to provide a new means for coupling together shafts with extensions therefor.

A further object of the invention is to provide such a device useful in connection with a power takeoff shaft driven from a conventional power takeoff system and adapted to couple the power takeoff driven shaft with an extension shaft for adjustment of relative longitudinal position without interrupting rotational connection.

A further object of the invention is to provide such a means in connection with the power takeoff driven shaft which comprises a substantially rectangular box having a pair of series of rollers journalled in said box adapted to support an extension shaft against oscillating or lateral movement relative to the box while permitting longitudinal movement thereof; and A further object of the invention is generally to improve the design, construction and efficiency of means coupling shafts together.

The means by which the foregoing and other objects of the present invention are accomplished and the manner of their accomplishment will be readily understood from the following specification upon reference to the accompanying drawings, in which.

Figure 1:
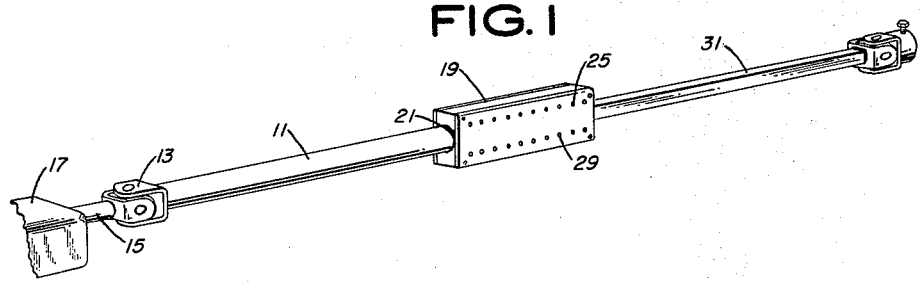
FIG. 1 is a perspective view of the device of the present invention associated with shaft means and with other devices shown fragmentarily.
Figure 2:
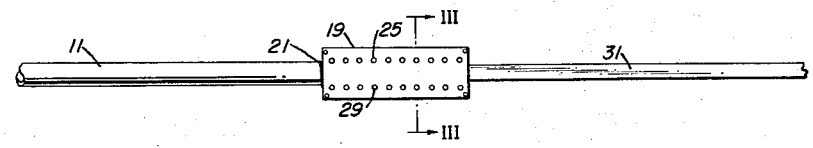
FIG. 2 is a side elevational view of the device as seen in FIG. 1.
Figure 3:
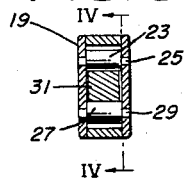
FIG. 3 is a view taken partly in section as on the line III—III of FIG. 2, and partly in elevation and on an enlarged scale.

Referring now to the drawings in which the various parts are indicated by numerals, the present device is adapted to be used with a hollow driven shaft member 11, the shaft member 11 coupled, as by a suitable joint 13, to the power shaft 15 forming part of the conventional power takeoff assembly of an agricultural machine fragmentarily indicated at 17.

At its end, remote from joint 13, shaft member 11 connects with a box-like hollow housing 19. The connection between shaft member 11 and housing 19 is preferably as by welding as shown at 21 providing a substantially integral connection between the housing and the shaft member so as to insure rotation of the housing in conjunction with the shaft member upon drive of the shaft member.

Housing 19 is of substantially rectangular internal cross-section and the hollow interior is in substantially longitudinal alinement with the longitudinal axis of hollow shaft 11, and communicates with the hollow shaft interior. On two of its opposed interior sides housing 19 is provided with series of roller bearings. Thus along one side of the housing is provided a parallel series of rollers 23 mounted upon shafts 25 journalled in the walls of housing 19. Similarily, the opposite side of housing 19 is provided with a like series of rollers 27 mounted upon suitable shafts 29 by which the rollers are journalled in the walls of housing 19.

Figure 4:
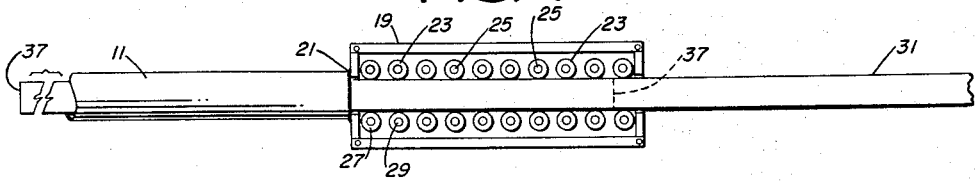
FIG. 4 is a view partly in section and partly in elevation taken as on the line IV—IV of FIG. 3.

The rollers 23, 27 are spaced apart so as to receive and support the projecting end 37 of an extension shaft 31. Shaft 31 is alined with shaft 11 and on adjustable shift telescopes therein as shown in FIG. 4. Shaft 31 is preferably of substantially square cross-section so that its flat opposite faces engage between the rollers 23, 27, against relative turning, while permitting longitudinal movement of shaft 31 relative to shaft 11 and housing 19.

In the assembly of the device the housing 19 is connected to shaft member 11, as by welding 21, and shaft 31 is inserted into the open interior of housing 19 between rollers 23 and 27. When thus arranged the inner shaft end 37 is substantially engaged between the rollers 23, 27, and even upon extreme movement of shaft 31 outwardly away from housing 19, a substantial engagement of the shaft end between the rollers is continued.

It thus will be seen that a rotational coupling is effected between shaft member 11 and extension shaft 31 through the medium of housing 19 and its rollers 23, 27 insuring conjoint rotation between the shaft elements upon drive of shaft element 11 from power takeoff 17. For convenience of assembly or disassembly of the device relative to any tools that are to be coupled to extension shaft 31, longitudinal movement is permitted through the same support, the driving connection between the shafts being maintained by the inner end 37 of shaft 31 engaged between the rollers. A wide range of relative longitudinal movement between the shafts is thus provided which is useful in adjusting to conditions to be met in the field.

I claim:
1. Coupling means adapted for use with a machine power takeoff having a power shaft, a hollow driven shaft drivingly connected at one end to said power shaft, said coupling means comprising a box having a hollow interior of substantially rectangular cross-section having an area in excess of the cross-sectional area of said driven shaft said box being rigidly secured at one end to the other end of said driven shaft for rotation with said driven shaft, with the hollow interior in substantially longitudinal alinement with the longitudinal axis and hollow interior of the driven shaft, said box adjacent two opposed sides of its hollow interior journalling parallel series of bearing rollers supported perpendicularly to said axis, each said series of rollers being respectively spaced from the box interior side opposed to the series and said rollers spanning from side to side of said box interior, the other end of said box being open, an extension shaft of similar rectangular cross-section having one end inserted into said box open end, said rollers engaging and spanning the exterior of two faces of said extension shaft for longitudinal shifting movement of said extension shaft rela- tive to said box, the inserted end of said extension shaft telescopically extending beyond said box into the hollow interior of the driven shaft to permit longitudinal movement of said extension shaft relative to said box and driven shaft, the engagement of said extension shaft inserted end with the interior of said box and with said rollers rotationally coupling said extension shaft to said driven shaft for rotation conjoint therewith while permitting relative longitudinal shaft movement.

2. Coupling means adapted for use with a machine power takeoff having a power shaft, a hollow driven shaft drivingly connected at one end to said power shaft, said coupling means comprising a box having a hollow interior of substantially rectangular cross-section having an area in excess of the cross-sectional area of said driven shaft, said box being rigidly secured at one end to the other end of said driven shaft for rotation with said driven shaft, with the hollow interior in substantially longitudinal alinement with the longitudinal axis and hollow interior of the driven shaft, said box adjacent at least one side of its hollow interior journalling a series of parallel bearing rollers supported perpendicularly to said axis, said series of rollers being spaced from the box interior side opposed to the series and said rollers spanning from side to side of said box interior, the other end of said box being open, an extension shaft of similar rectangular cross-section having one end inserted into said box open end, said rollers engaging and spanning the exterior of at least one face of said extension shaft for longitudinal shifting movement of said extension shaft relative to said box, the inserted end of said extension shaft telescopically extending beyond said box into the hollow interior of the driven shaft to permit longitudinal movement of said extension shaft relative to said box and driven shaft, the engagement of said extension shaft inserted end with the interior of said box and with said rollers rotationally coupling said extension shaft to said driven shaft for rotation conjoint therewith while permitting relative longitudinal shaft movement.

3. Coupling means adapted for use with a machine power takeoff having a power shaft, a hollow driven shaft drivingly connected at one end to said power shaft, said coupling means comprising a box having a hollow interior of substantially rectangular cross-section having an area in excess of the cross-sectional area of said driven shaft, said box being rigidly secured at one end to the other end of said driven shaft for rotation with said driven shaft, with the hollow interior in substantially longitudinal alinement with the longitudinal axis and hollow interior of the driven shaft, bearing means mounted in said box adjacent at least one side of its hollow interior spaced from the box interior side opposed to the bearing means, said bearing means spanning from side to side of said box interior, the other end of said box being open, an extension shaft of similar rectangular cross-section having one end inserted into said box open end, said bearing means engaging and spanning the exterior of at least one face of said extension shaft for longitudinal shifting movement of said extension shaft relative to said box, the inserted end of said extension shaft telescopically extending beyond said box into the hollow interior of the driven shaft to permit longitudinal movement of said extension shaft relative to said box and driven shaft, the engagement of said extension shaft inserted end with the interior of said box and with said bearing means rotationally coupling said extension shaft to said driven shaft for rotation conjoint therewith while permitting limited relative longitudinal shaft movement.

References Cited by the Examiner
UNITED STATES PATENTS

| 163,083 | 5/75 | Knock | 64—23 |
| 1,310,971 | 7/19 | Timberlake | 64—23 |
| 2,050,497 | 4/36 | McCollum | 64—23 |
| 2,140,659 | 12/38 | Vock | 64—23.7 |
| 2,774,568 | 12/56 | Jones | 64—23 |
| 2,995,908 | 8/61 | Mazziott et al. | 64—23 |

ROBERT C. RIORDON, *Primary Examiner.*